(12) United States Patent
Imajo

(10) Patent No.: US 6,882,801 B2
(45) Date of Patent: Apr. 19, 2005

(54) WAVELENGTH DIVISION MULTIPLEX OPTICAL STAR COUPLER, COMMUNICATION STATION, AND OPTICAL TRANSMISSION SYSTEM

(75) Inventor: Yoshihiro Imajo, Tokyo (JP)

(73) Assignee: Kokusai Electric Co., Ltd., Tokyo (JP)

( * ) Notice: Subject to any disclaimer, the term of this patent is extended or adjusted under 35 U.S.C. 154(b) by 175 days.

(21) Appl. No.: 09/931,111

(22) Filed: Aug. 17, 2001

(65) Prior Publication Data

US 2001/0053011 A1 Dec. 20, 2001

Related U.S. Application Data

(62) Division of application No. 09/386,297, filed on Aug. 31, 1999.

(30) Foreign Application Priority Data

Aug. 31, 1998 (JP) ............................................ 10-260823
Jul. 8, 1999 (JP) ............................................ 11-193941

(51) Int. Cl.[7] ............................................ H04B 10/00
(52) U.S. Cl. ............................................ 398/72; 398/63
(58) Field of Search ................................. 359/124, 125, 359/120, 121; 398/70, 71, 72, 167.5, 63, 61, 84; 385/46, 89

(56) References Cited

U.S. PATENT DOCUMENTS

| | | | |
|---|---|---|---|
| 4,581,770 A | 4/1986 | Haworth ........................ 398/3 |
| 4,723,309 A | 2/1988 | Mochizuki et al. ........... 398/37 |
| 4,801,190 A | 1/1989 | Imoto ............................ 385/24 |
| 4,850,047 A | 7/1989 | Iguchi et al. .................. 398/60 |
| 5,159,479 A | * 10/1992 | Takagi ........................ 398/116 |
| 5,189,414 A | 2/1993 | Tawara ..................... 340/825.5 |
| 5,202,780 A | * 4/1993 | Fussanger .................... 359/125 |
| 5,432,875 A | * 7/1995 | Korkowski et al. ............ 385/27 |
| 5,896,213 A | * 4/1999 | Nagahori et al. ............ 398/100 |
| 5,926,298 A | * 7/1999 | Li ................................ 385/24 |
| 5,936,753 A | * 8/1999 | Ishikawa .................... 359/125 |

* cited by examiner

Primary Examiner—Jason Chan
Assistant Examiner—Christina Y Leung
(74) Attorney, Agent, or Firm—Pillsbury Winthrop LLP

(57) ABSTRACT

A wavelength division multiplex optical star coupler comprises an input port which inputs a first optical signal, a first optical coupler which divides the first optical signal input from the input port into a plurality of first optical signals, a plurality of input/output ports, each of which outputs one of the plurality of first optical signals divided by the first optical coupler and inputs a second optical signal, an output port which outputs the second optical signal, and a second optical coupler, provided between the input port and the first optical coupler or between the first optical coupler and the input/output ports, which provides the first optical signal to the input/output ports and the second optical signal to the output port.

7 Claims, 5 Drawing Sheets

WAVELENGTH DIVISION MULTIPLEX OPTICAL STAR COUPLER, COMMUNICATION STATION, AND OPTICAL TRANSMISSION SYSTEM

CROSS-REFERENCE TO RELATED APPLICATIONS

This application is a Divisional of U.S. patent application Ser. No. 09/386,297, filed Aug. 31, 1999, which is based upon and claims benefit of priority of Japanese Patent Applications No. Hei-10-260823, filed on Aug. 31, 1998, and No. Hei-11-193941, filed on Jul. 8, 1999 the contents of which are incorporated herein by reference.

BACKGROUND OF THE INVENTION

1. Field of Invention

The present invention relates to a wavelength division multiplex optical star coupler, a communication station, and an optical transmission system. In particular, the present invention relates to an optical transmission system that uses a wavelength division multiplex optical star coupler which combines an optical star coupler and a wavelength division multiplex optical coupler.

2. Description of Related Art

An optical fiber communication using an optical fiber as a light propagation line will be described as a conventional art. Usually, an optical star coupler of 1 to n branching is used for dividing an optical signal, which is generated from one source, into a plurality of signals. Here, n is an integer more than 2. It is possible to transmit the same optical signal to a plurality of multiple destinations by the optical star coupler. An optical fiber fusion type and an optical waveguide type are mainly used for the optical star coupler. The optical star coupler is not only used for distributing the light, but also used as a light multiplexer which multiplexes the optical signal output from different light sources because the optical star coupler usually works bidirectionally.

One of methods to use a single optical fiber efficiently is a wavelength division multiplex method that utilizes different wavelengths of the optical signals. Recently, a wavelength division multiplex optical coupler is used for multiplexing or de-multiplexing the optical signals having different wavelengths in the wavelength division multiplex method.

FIG. 1 shows a conventional wavelength division multiplex optical coupler. The wavelength division multiplex optical coupler 10 is basically the same as a 1 to 2 optical de-multiplexer or multiplexer. One side of the wavelength division multiplex optical coupler 10 is connected to a port P20, which can input and output the first optical signal $\lambda 1$ and the second optical signal $\lambda 2$. The other side of the wavelength division multiplex optical coupler 10 is connected to a port P22, which can input and output only the first optical signal $\lambda 1$, and a port P24, which can input and output only the second optical signal $\lambda 2$.

The first optical signal $\lambda 1$ and the second optical signal $\lambda 2$ have different wavelengths with each other. The first optical signal $\lambda 1$ input from the port P20 is output to the port P22, and the second optical signal $\lambda 2$ input from the port P20 is output to the port P24. The first optical signal $\lambda 1$ input from the port P22 and the second optical signal $\lambda 2$ input from the port P24 are output to the port P20. The ordinary wavelength division multiplex optical coupler is described in Japanese Patent Application Laid-Open No. H10-173265.

FIG. 2 shows a one-way direction wavelength division multiplex optical communication realized by the wavelength division multiplex method. One side of the wavelength division multiplex optical coupler 10 is connected to a port P26, which can input only the first optical signal $\lambda 1$, and a port P28, which can input only the second optical signal $\lambda 2$. The other side of the wavelength division multiplex optical coupler 10 is connected to the port P30, which can input the first optical signal $\lambda 1$ and the second optical signal $\lambda 2$. The first optical signal $\lambda 1$ input from the port P26 and the second optical signal $\lambda 2$ input from the port P28 are output to the port 30 through the wavelength division multiplex optical coupler 10. The direction of the communication is one-way from the port P26 and the port P28 to the port 30.

FIG. 3 shows a two-way direction wavelength division multiplex optical communication realized by the wavelength division multiplex method. One side of a wavelength division multiplex optical coupler 10a is connected to a port P32, which can input only the first optical signal $\lambda 1$, and a port P34, which can output only the second optical signal $\lambda 2$. The other side of the wavelength division multiplex optical coupler 10a is connected to a wavelength division multiplex optical coupler 10b.

One side of the wavelength division multiplex optical coupler 10b is connected to a port P36, which can input only the second optical signal $\lambda 2$, and a port P38, which can output only the first optical signal $\lambda 1$. The other side of the wavelength division multiplex optical coupler 10b is connected to the wavelength division multiplex optical coupler 10a. The wavelength division multiplex optical coupler 10a and 10b are connected by a single optical fiber.

The first optical signal $\lambda 1$ input from the port P32 is output to the port P38 through the wavelength division multiplex optical couplers 10a and 10b. The second optical signal $\lambda 2$ input from the port P36 is output to the port P34 through the wavelength division multiplex optical couplers 10a and 10b. The direction of the communication is bidirection from the port P32 to the port P38 and from the port P36 to the port P34.

Therefore, the optical communication that transmits an optical signal from one light source, such as a main unit, to a plurality of receiving terminals, such as sub units, and transmits the optical signals from the sub units to the main unit become possible by using the wavelength division multiplex optical coupler 10.

However, because the optical parts such as a star coupler and a wavelength division multiplex optical coupler use an optical fiber for the input/output, radiation loss will occur when bending the optical fiber. In the case of a quarts single mode fiber, the optical fiber has to be bent more than 30 mm of radius of curvature. Furthermore, there is the possibility of the breaking an optical fiber in the case of using the optical fiber strand with 250 $\mu$m of outward diameter to save the space for wiring. In the case of using a code with 2 mm to 3 mm of outward diameter to protect the optical fiber, the wiring space will increase because the outward diameter of the code is larger than the outward diameter of the optical fiber strand. Especially, as the number of branching of an optical star coupler is larger, the wiring space has to be larger. Therefore, the conventional art requires the work of packing the optical fiber without breaking it by considering the radius of curvature of the optical fiber.

SUMMARY OF THE INVENTION

As stated, it is an object of the present invention to provide a wavelength division multiplex optical star coupler that is capable of solving the problems described above. Also, it is an object of the present invention to provide a communication station and optical transmitting system using the wavelength division multiplex optical star coupler. The object of the present invention can be achieved by the combinations of features described in the independent claims of the present invention. The dependent claims of the present invention define further advantageous embodiments of the present invention According to the first aspect of the present invention, a wavelength division multiplex optical star coupler can be provided which comprises an input port which inputs a first optical signal, a first optical coupler which divides the first optical signal input from the input port into a plurality of first optical signals, a plurality of input/output ports, each of which outputs one of the plurality of first optical signals divided by the first optical coupler and inputs a second optical signal, an output port which outputs the second optical signal, and a second optical coupler, provided between the input port and the first optical coupler or between the first optical coupler and the input/output ports, which provides the first optical signal to the input/output ports and the second optical signal to the output port.

A wavelength division multiplex optical star coupler can be provided which further has a plurality of the output ports and a plurality of the second optical couplers, each of which is provided between the first optical coupler and one of the input/output ports. A wavelength division multiplex optical star coupler can be provided such that each of the second optical couplers provides one of the second optical signals to one of the plurality of output ports and each of the plurality of output ports outputs one of the second optical signals.

A wavelength division multiplex optical star coupler can be provided such that the second optical coupler is provided between the input port and the first optical coupler, and the first optical coupler further multiplexes a plurality of the second optical signals and provides the second optical signal to the second optical coupler, and the second optical coupler provides the first optical signal input from the input port to the first optical coupler and provides the second optical signal multiplexed by the first optical coupler to the output port.

A wavelength division multiplex optical star coupler can be provided such that the second optical coupler is a wavelength division multiplex optical coupler that selects an optical signal, a wavelength of which has a prescribed relationship with a wavelength of the second optical signal, from optical signals input to the second optical coupler and outputs the selected optical signal to the output port.

A wavelength division multiplex optical star coupler can be provided such that each of the input port, the input/output port, and the output port has an optical connector adapter that mounts an optical fiber in such a way as capable of attaching and removing the optical fiber.

According to the other aspect of the present invention, a communication station can be provided which comprises an electro-optical converter which inputs an electric signal and converts the electric signal to a first optical signal, a first optical coupler which divides the first optical signal into a plurality of first optical signals, a plurality of input/output ports, each of which outputs one of the plurality of first optical signals divided by the first optical coupler and inputs a second optical signal, an output port which outputs the second optical signal, a second optical coupler, provided between the electro-optical converter and the first optical coupler or between the first optical coupler and the input/output ports, which provides the first optical signal to the input/output ports and the second optical signal to the output port, an opto-electric converter which converts the second optical signal output from the output port to a second electric signal, and an electric signal output terminal which outputs the second electric signal.

A communication station can be provided which further has a plurality of the output ports, a plurality of the second optical couplers, each of which is provided between the first optical coupler and one of the input/output ports, a plurality of the opto-electric converters, each of which is provided for one of a plurality of the output ports, and an electric signal multiplexer which multiplexes a plurality of the second electric signals output from a plurality of the opto-electric converters and outputs the multiplexed second electric signal to the electric signal output terminal.

A communication station can be provided such that each of the second optical couplers provides one of the second optical signals to one of the plurality of output ports, each of the plurality of output ports outputs one of the second optical signals, and each of the plurality of opto-electric converters converts one of the second optical signals to the second electric signal.

A communication station can be provided such that the second optical coupler is provided between the electro-optical converter and the first optical coupler, the first optical coupler further multiplexes a plurality of the second optical signals and provides the second optical signal to the second optical coupler, and the second optical coupler provides the first optical signal input from the electro-optical converter to the first optical coupler and provides the second optical signal multiplexed by the first optical coupler to the output port.

A communication station can be provided such that the second optical coupler is a wavelength division multiplex optical coupler that selects an optical signal, a wavelength of which has a prescribed relationship with a wavelength of the second optical signal, from optical signals input to the second optical coupler and outputs the selected optical signal to the output port.

A communication station can be provided such that each of the input/output port and the output port has an optical connector adapter that mounts an optical fiber in such a way as capable of attaching and removing the optical fiber.

According to the still other aspect of the present invention, an optical transmission system can be provided which comprises a main unit which inputs a first electric signal and outputs a plurality of first optical signals, and inputs a second optical signal and outputs a second electric signal, a plurality of sub units, each of which inputs one of the plurality of first optical signals from the main unit and outputs a third electric signal, and inputs a fourth electric signal and provides the second optical signal to the main unit; and a plurality of optical fibers, each of which connects the main unit and the plurality of sub units.

An optical transmission system can be provided such that the main unit has an electro-optical converter which inputs the first electric signal and converts the first electric signal to a first optical signal, a first optical coupler which divides the first optical signal into a plurality of first optical signals, a plurality of input/output ports, each of which outputs one of the plurality of first optical signals divided by the first optical coupler to one of the sub units through one of the optical fibers and inputs the second optical signal from one of the sub units through one of the optical fibers, an output port which outputs the second optical signal, a second optical coupler, provided between the electro-optical converter and the first optical coupler or between the first optical coupler and the input/output ports, which provides the first optical signal to the input/output ports and the second optical signal to the output port, an opto-electric converter which converts the second optical signal output from the output port to a second electric signal, and an electric signal output terminal which outputs the second electric signal.

An optical transmission system can be provided which further has a plurality of the output ports, a plurality of the second optical couplers, each of which is provided between the first optical coupler and one of the input/output ports, a plurality of the opto-electric converters, each of which is provided for one of a plurality of the output ports, and a electric signal multiplexer which multiplexes a plurality of the second electric signals output from a plurality of the opto-electric converters and outputs the multiplexed second electric signal to the electric signal output terminal.

An optical transmission system can be provided such that each of the second optical couplers provides one of the second optical signals to one of the plurality of output ports, each of the plurality of output ports outputs one of the second optical signals, and each of the opto-electric converters converts one of the second optical signals to the second electric signal.

An optical transmission system can be provided such that the second optical coupler is provided between the electro-optical converter and the first optical coupler, the first optical coupler further multiplexes a plurality of the second optical signals and provides the second optical signal to the second optical coupler, and the second optical coupler provides the first optical signal input from the electro-optical converter to the first optical coupler and provides the second optical signal multiplexed by the first optical coupler to the output port.

An optical transmission system can be provided such that the second optical coupler is a wavelength division multiplex optical coupler that selects an optical signal, a wavelength of which has a prescribed relationship with a wavelength of the second optical signal, from optical signals input to the second optical coupler and outputs the selected optical signal to the output port.

An optical transmission system can be provided such that the sub unit has a sub unit input/output terminal which inputs the first optical signal from the main unit through the optical fiber, an opto-electric converter which inputs the first optical signal and converts the first optical signal to the third electric signal, an antenna which outputs the third electric signal and inputs the fourth electric signal, an electro-optical converter which converts the fourth electric signal to the second optical signal, and a wavelength division multiplex optical coupler which provides the first optical signal to the opto-electric converter and the second optical signal to the sub unit input/output terminal.

An optical transmission system can be provided such that each of the input/output port and the output port has an optical connector adapter that mounts an optical fiber in such a way as capable of attaching and removing the optical fiber.

DETAILED DESCRIPTION OF THE INVENTION

The present invention will be explained using embodiments of the present invention. The following embodiments, however, do not limit the scope of the present invention described in the claims. Moreover, not all the features or their combinations described in the embodiments are necessarily essential for the present invention.

Figure 1:
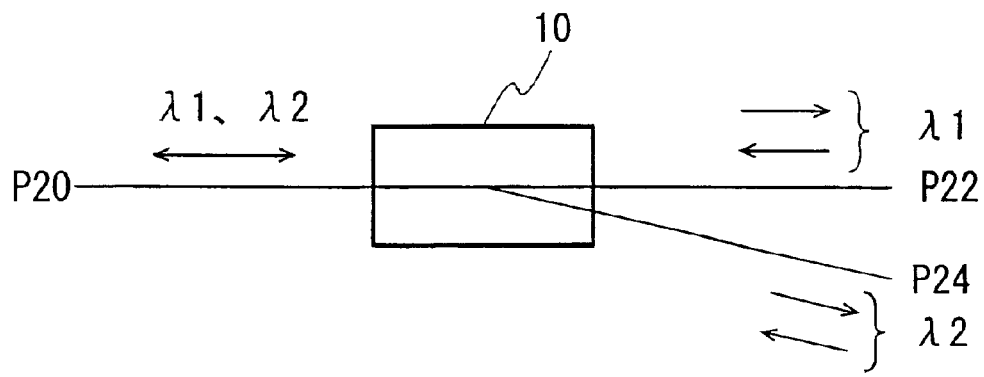
FIG. 1 shows a wavelength division multiplex optical coupler of the conventional art.
Figure 2:
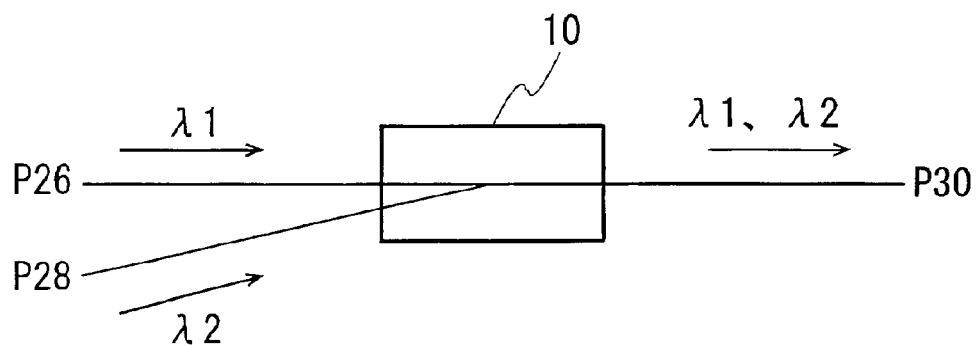
FIG. 2 shows a one-way direction wavelength division multiplex optical communication realized by the wavelength division multiplex method.
Figure 3:
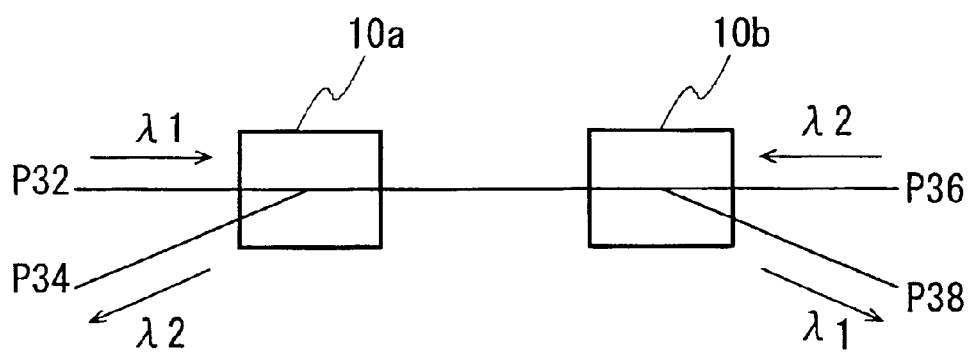
FIG. 3 shows a two-way direction wavelength division multiplex optical communication realized by the wavelength division multiplex method.
Figure 4:
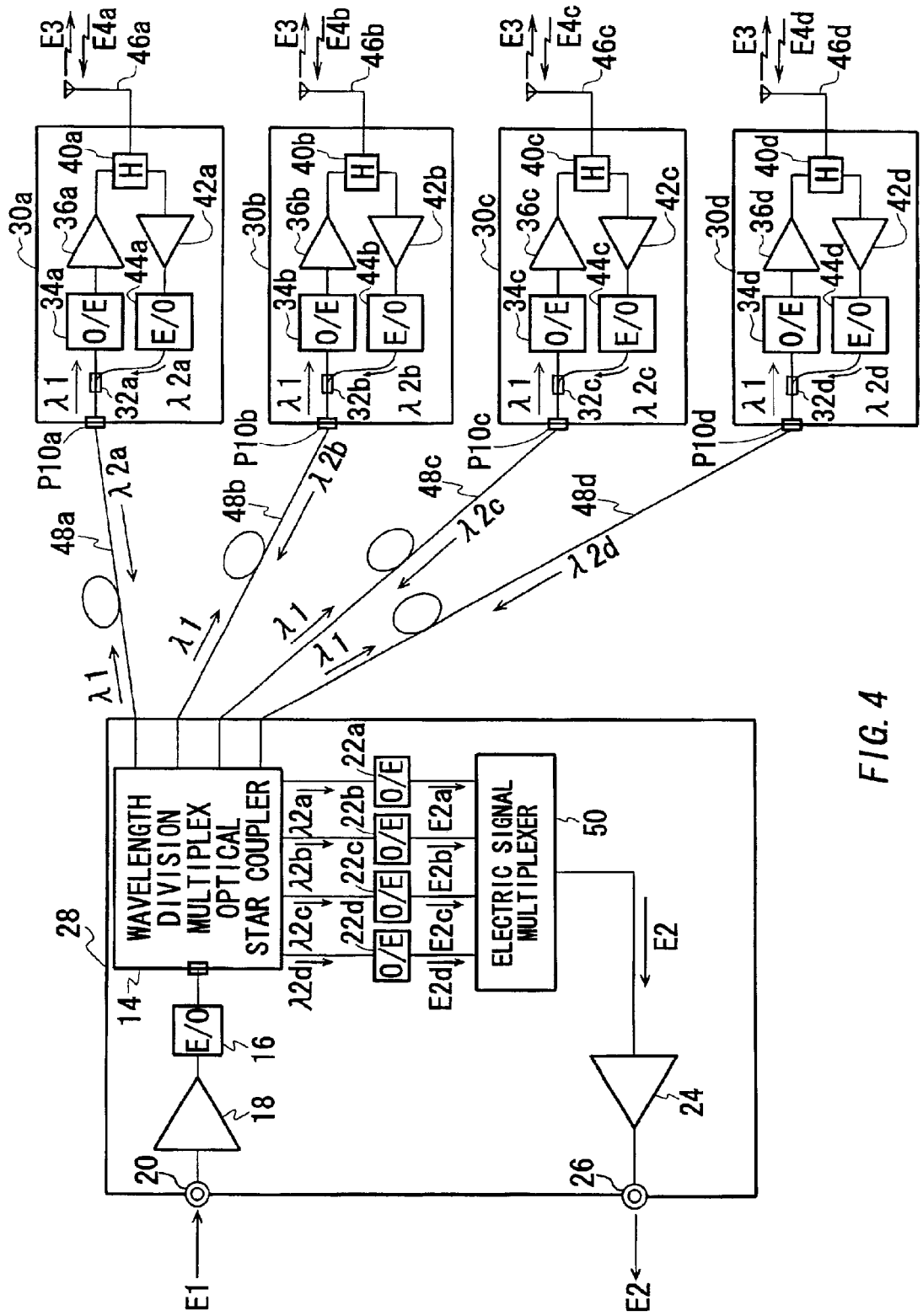
FIG. 4 shows an optical transmission system according to the first embodiments of the present invention.

FIG. 4 shows an optical transmission system according to the first embodiments of the present invention. The optical transmission system comprises a main unit 28, which is one example of a communication station, four sub units 30a, 30b, 30c, and 30d, and four optical fibers 48a, 48b, 48c, and 48d.

The main unit 28 inputs the first electric signal E1 and outputs a plurality of the first optical signals $\lambda 1$, and inputs a plurality of the second optical signals $\lambda 2a$, $\lambda 2b$, $\lambda 2c$, and $\lambda 2d$ and outputs the second electric signal E2.

Each of the sub units 30a, 30b, 30c, and 30d inputs the first optical signal $\lambda 1$ from main unit 28 and outputs the third electric signal E3 to the outside of the optical transmission system and inputs the fourth electric signal E4a, E4b, E4c, and E4d from the outside of the optical transmission system and provides the second optical signals $\lambda 2a$, $\lambda 2b$, $\lambda 2c$, and $\lambda 2d$ to the main unit 28.

Each of the optical fibers 48a, 48b, 48c, and 48d connects the main unit 28 with each of the sub units 30a, 30b, 30c, and 30d. Each of the optical fibers 48a, 48b, 48c, and 48d is a two-way optical fiber used for both transmitting and receiving.

Each of the first optical signals $\lambda 1$ distributed by the main unit 28 has substantially the same wavelength. For example, the wavelength of all of the first optical signals $\lambda 1$ is 1310 nm band. The second optical signals $\lambda 2a$, $\lambda 2b$, $\lambda 2c$, and $\lambda 2d$, which are output from each of the sub units 30a, 30b, 30c, and 30d to the main unit 28, have a wavelength of, for example, a 1550 nm band.

The main unit 28 has an electric signal input terminal 20 that inputs the first electric signal E1, an amplifier 18 that amplifies the first electric signal E1, an electro-optical converter 16 that converts the first electric signal E1 to the first optical signal $\lambda 1$, a wavelength division multiplex optical star coupler 14 that divides the first optical signal $\lambda 1$ and outputs the divided first optical signal $\lambda 1$, a plurality of optical-electro converters 22a, 22b, 22c, and 22d that converts each of the second optical signals $\lambda 2a$, $\lambda 2b$, $\lambda 2c$, and $\lambda 2d$ to electric signals E2a, E2b, E2c, and E2d, an electric signal multiplexer 50 that multiplexes the plurality of the second electric signals E2a, E2b, E2c, and E2d, an amplifier 24 that amplifies the multiplexed second electric signal E2, and an electric signal output terminal 26 that outputs the multiplexed second electric signal E2.

When using the optical transmission system of the present invention for mobile radio communication, the main unit 28 is connected to a radio modulator-demodulator equipment. The electric signal input terminal 20 is connected to the transmit port of the radio modulator-demodulator equipment, and the electric signal output terminal 26 is connected to the receiving port of the radio modulator-demodulator equipment.

The first optical signal E1 is input from the radio modulator-demodulator equipment to the electric signal input terminal 20. The first optical signal E1 input to the main unit 28 is amplified to the suitable level by the amplifier 18. The amplified first optical signal E1, which is an analog signal, is converted to the first optical signal $\lambda 1$, which is also an analog signal, by the electro-optical converter 16. The converted first optical signal $\lambda 1$ is divided into four first optical signals $\lambda 1$ by the wavelength division multiplex optical star coupler 14. Each of the divided first optical signals $\lambda 1$ is output to the sub units 30a, 30b, 30c, and 30d through the optical fibers 48a, 48b, 48c, and 48d.

Each of the second optical signals $\lambda 2a, \lambda 2b, \lambda 2c$, and $\lambda 2d$ is input from the sub units 30a, 30b, 30c, and 30d to the main unit 28 through the optical fibers 48a, 48b, 48c, and 48d. The second optical signals $\lambda 2a, \lambda 2b, \lambda 2c$, and $\lambda 2d$ are input to the wavelength division multiplex optical star coupler 14. The wavelength division multiplex optical star coupler 14 outputs each of the second optical signals $\lambda 2a, \lambda 2b, \lambda 2c$, and $\lambda 2d$ to the opto-electric converters 22a, 22b, 22c, and 22d. Each of the second optical signals $\lambda 2a, \lambda 2b, \lambda 2c$, and $\lambda 2d$ are converted to the second electric signal E2a, E2b, E2c, and E2d by the opto-electric converters 22a, 22b, 22c, and 22d. The converted second electric signals E2a, E2b, E2c, and E2d are multiplexed by the electric signal multiplexer 50 and the multiplexed signal is output to the amplifier 24 as the second electric signal E2. The multiplexed second electric signal E2 is amplified by the amplifier 24 and is output to the electric signal output terminal 26.

The sub unit 30a has a sub unit input/output terminal P10a that inputs the first optical signal $\lambda 1$, an opto-electric converter 34a that converts the first optical signal $\lambda 1$ to the third electric signal E3, an amplifier 36a that amplifies the third electric signal E3, an antenna common unit 40a that provides the third electric signal E3 to the antenna 46a, an antenna 46a that outputs the third electric signal E3 to the outside of the optical transmission system, an amplifier 42a that amplifies the fourth electric signal E4, an electro-optical converter 44a that converts the fourth electric signal E4 to the second optical signal $\lambda 2a$, and a wavelength division multiplex optical coupler 32a that provides the first optical signal $\lambda 1$ to the opto-electric converter 34a and provides the second optical signal $\lambda 2a$ to the sub unit input/output terminal P10a. Each of the sub units 30b, 30c, and 30d has the same composition with the sub unit 30a.

The first optical signal $\lambda 1$ is input from the main unit 28 through the optical fiber 48a to the sub unit input/output terminal P10a. The first optical signal $\lambda 1$ is passed through the wavelength division multiplex optical coupler 32a and provided to the opto-electric converter 34a. The first optical signal $\lambda 1$ is converted to the third electric signal E3 by the opto-electric converter 34a. The converted third electric signal E3 is provided to the amplifier 36a and amplified to the suitable level by the amplifier 36a. The amplified third electric signal E3 is provided to the antenna 46a by the antenna common unit 40a and output to the outside of the optical transmission system.

The fourth electric signal E4a is caught by the antenna 46a from the outside of the optical transmission system. The fourth electric signal E4a caught by the antenna 46a is provided to the amplifier 42a by the antenna common unit 40a. The fourth electric signal E4a is amplified by the amplifier 42a and provided to the opto-electric converter 44a. The fourth electric signal E4a, which is an analog signal, is converted to the second optical signal $\lambda 2a$, which is also an analog signal, by the electro-optical converter 44a. The second optical signal $\lambda 2a$ is provided to the sub unit input/output terminal P10a by the wavelength division multiplex optical coupler 32a and is output to the main unit 28 through the optical fiber 48a. Each of the sub units 30b, 30c, and 30d operates the same way as the sub unit 30a.

Figure 5:
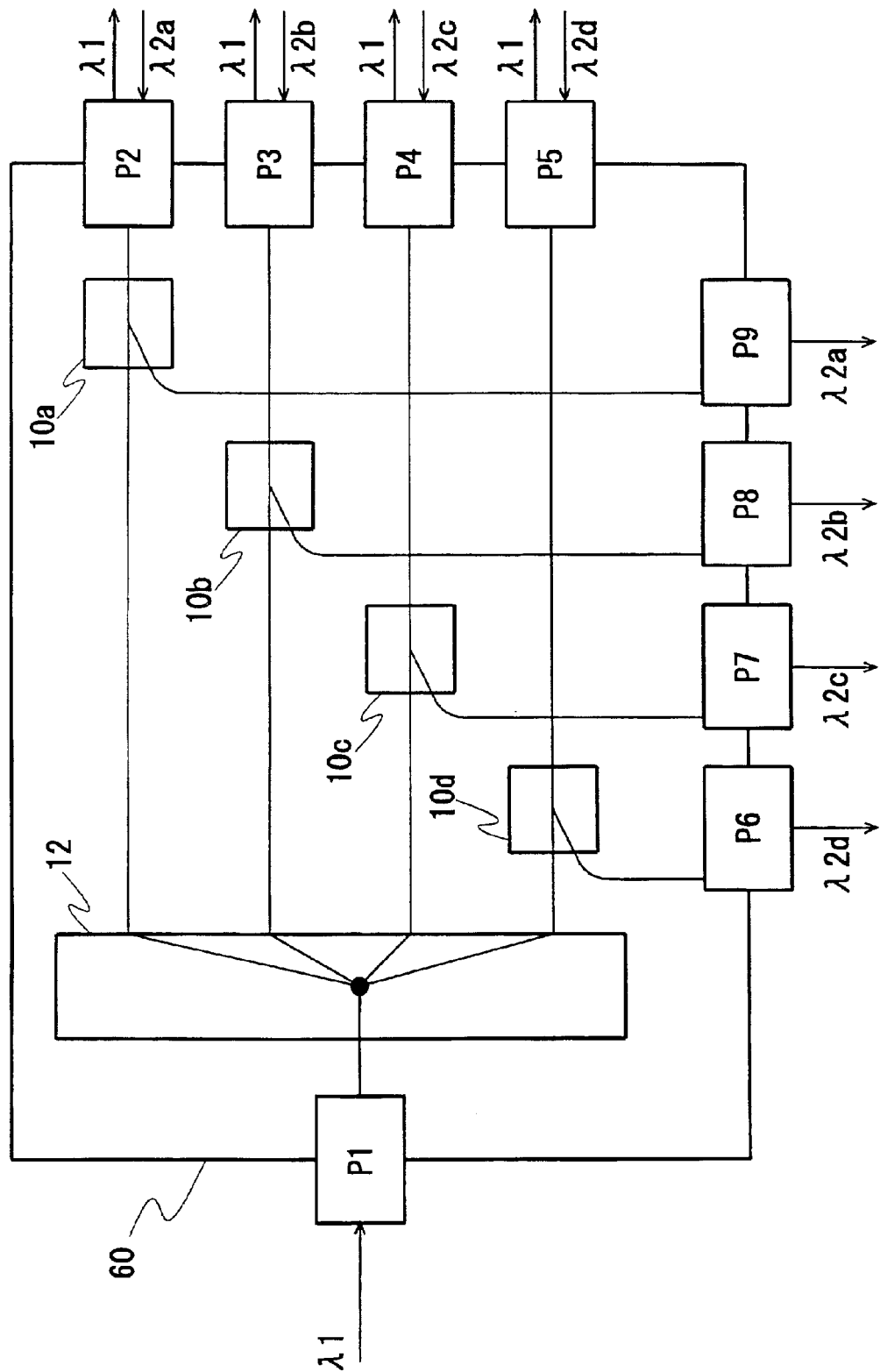
FIG. 5 shows the wavelength division multiplex optical star coupler 14 according to the first embodiments of the present invention.

FIG. 5 shows the wavelength division multiplex optical star coupler 14 according to the first embodiments of the present invention. The wavelength division multiplex optical star coupler 14 has an input port P1 that inputs the first optical signal $\lambda 1$, an optical star coupler 12 that divides the first optical signal $\lambda 1$ into four first optical signals $\lambda 1$, four input/output ports P2, P3, P4, and P5, each of which outputs the divided first optical signals $\lambda 1$, four output ports P6, P7, P8, and P9, each of which outputs the second optical signals $\lambda 2d, \lambda 2c, \lambda 2b$, and $\lambda 2a$, four wavelength division multiplex optical couplers 10a, 10b, 10c, and 10d that are provided between the optical star coupler 12 and the input/output ports P2, P3, P4, and P5 for each of the divided first optical signals $\lambda 1$, and a housing 60 that contains the components shown above. Each of the input port P1, the input/output ports P2, P3, P4, and P5, and the output ports P6, P7, P8, and P9 has an optical connector adapter that mounts an optical fiber in such a way as capable of attaching and removing the optical fiber.

The first optical signal $\lambda 1$ is input to the input port P1 from the electro-optical converter 16. The first optical signal $\lambda 1$ is input to the optical star coupler 12 from the input port P1. The first optical signal $\lambda 1$ is divided into four first optical signals $\lambda 1$ by the optical star coupler 12. Each of the divided first optical signals $\lambda 1$ is passed through the wavelength division multiplex optical couplers 10a, 10b, 10c, and 10d and is provided to the input/output ports P2, P3, P4, and P5.

Each of the second optical signals $\lambda 2a, \lambda 2b, \lambda 2c$, and $\lambda 2d$ is input to the input/output ports P2, P3, P4, and P5. Each of the second optical signals $\lambda 2a, \lambda 2b, \lambda 2c$, and $\lambda 2d$ input from the input/output ports P2, P3, P4, and P5 is output to the output ports P9, P8, P7, and P6 by the wavelength division multiplex optical couplers 10a, 10b, 10c, and 10d. Each of the wavelength division multiplex optical couplers 10a, 10b, 10c, and 10d selects an optical signal having the same wavelength with the wavelength of the second optical signals $\lambda 2a, \lambda 2b, \lambda 2c$, and $\lambda 2d$ from an input optical signals and outputs the selected optical signal to the output ports P9, P8, P7, and P6.

Figure 6:
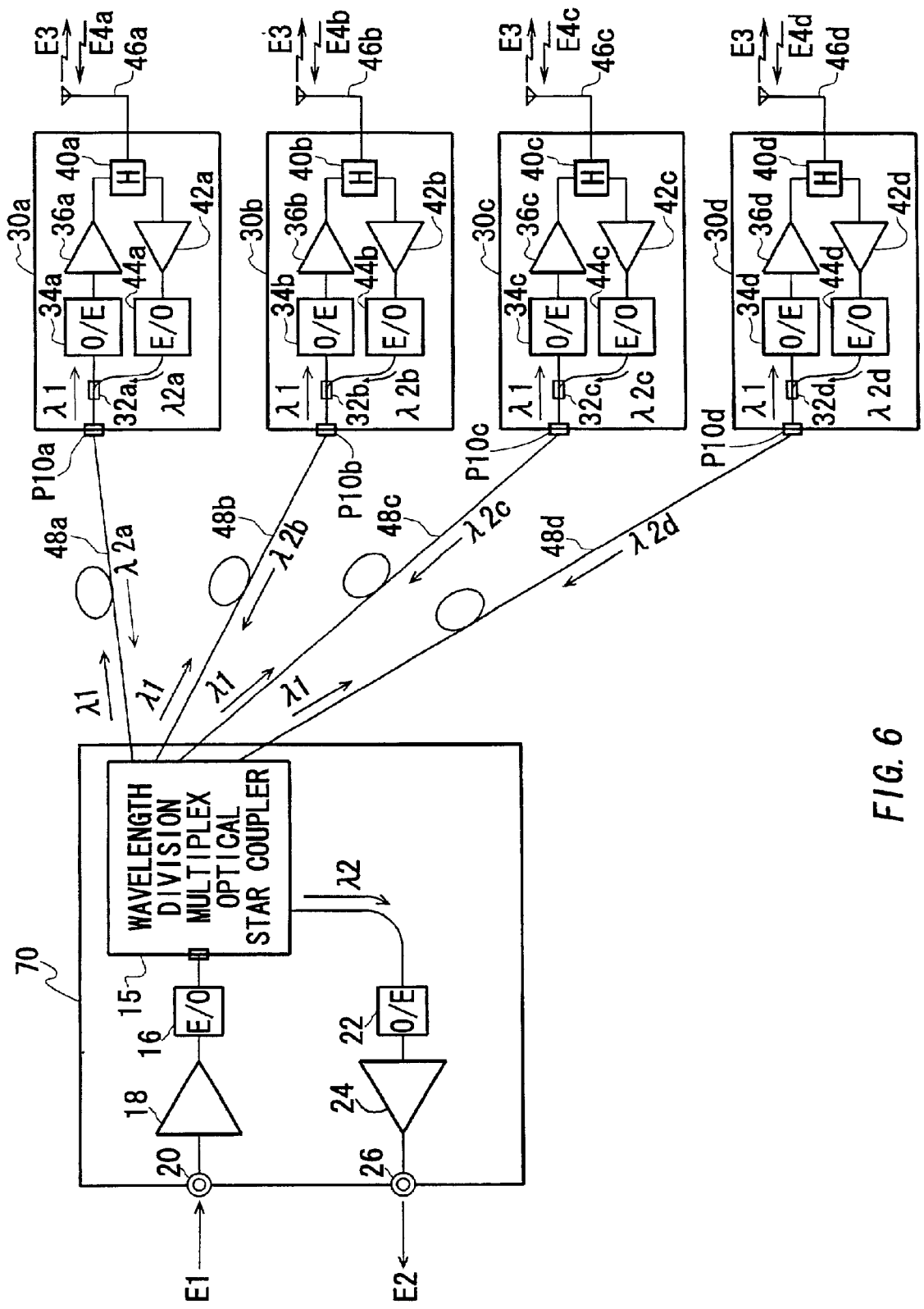
FIG. 6 shows an optical transmission system according to the second embodiments of the present invention.

FIG. 6 shows the optical transmission system according to the second embodiments of the present invention. Because the optical star coupler 12 works bidirectionally, the optical star coupler is not only used for distributing the light, but also used as a light multiplexer which multiplexes the optical signals output from the different light sources. By using the property of the light multiplexer of the optical star coupler 12, the second embodiments can be composed. The second embodiments have the same composition as the first embodiments except the main unit 70, which is one example of a communication station. Therefore, the composition and the operation of the main unit 70 will be described.

The main unit 70 has an electric signal input terminal 20 that inputs the first electric signal E1, an amplifier 18 that amplifies the first electric signal E1, an electro-optical converter 16 that converts the first electric signal E1 to the first optical signal λ1, a wavelength division multiplex optical star coupler 15 that divides the first optical signal λ1 and outputs the divided first optical signals λ1, an optical-electro converter 22 that converts the second optical signal λ2 to the second electric signal E2, an amplifier 24 that amplify the second electric signal E2, and an electric signal output terminal 26 that outputs the second electric signal E2.

The first optical signal E1 input to the main unit 70 through the electric signal input terminal 20 is amplified by the amplifier 18. The amplified first optical signal E1 is converted to the first optical signal λ1 by the electro-optical converter 16. The converted first optical signals λ1 is divided into four first optical signals λ1 by the wavelength division multiplex optical star coupler 15. The divided first optical signals λ1 are output to the sub units 30a, 30b, 30c, and 30d through each of the optical fibers 48a, 48b, 48c, and 48d.

The second optical signals λ2a, λ2b, λ2c, and λ2d input from each of the sub units 30a, 30b, 30c, and 30d to the main unit 70 are input to the wavelength division multiplex optical star coupler 15. The wavelength division multiplex optical star coupler 15 multiplexes the second optical signals λ2a, λ2b, λ2c, and λ2d and outputs the multiplexed second optical signal λ2 to the opto-electric converter 22. The second optical signal λ2 is converted to the second electric signal E2 by the opto-electric converter 22 and output to the amplifier 24. The multiplexed second electric signal E2 is equivalent to the multiplexed signal of the fourth electric signals E4a, E4b, E4c, and E4d caught by the antenna 46a, 46b, 46c, and 46d. The second electric signal E2 is amplified by the amplifier 24 to the suitable level and is output to the electric signal output terminal 26.

Figure 7:
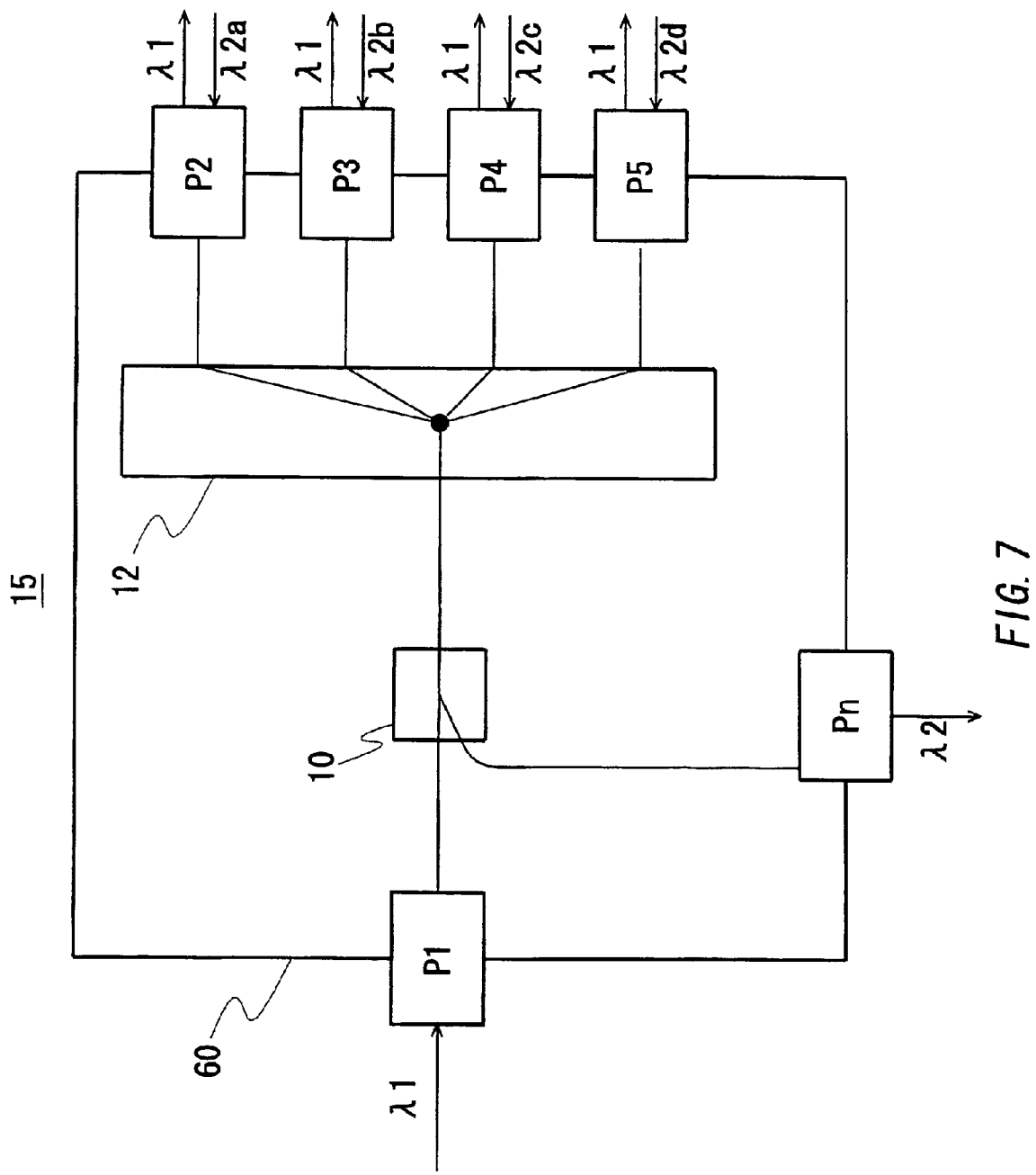
FIG. 7 shows the wavelength division multiplex optical star coupler 14 according to the second embodiments of the present invention.

FIG. 7 shows the wavelength division multiplex optical star coupler 15 according to the second embodiments of the present invention. The wavelength division multiplex optical star coupler 15 has an input port P1 that inputs the first optical signal λ1, an optical star coupler 12 that divides the first optical signal λ1 into four first optical signals λ1, four input/output ports P2, P3, P4, and P5, each of which outputs the divided first optical signals λ1, an output port Pn that outputs the second optical signal λ2, a wavelength division multiplex optical coupler 10 that is provided between the optical star coupler 12 and the input port P1, and a housing 60 that contains the components shown above. Each of the input port P1, the input/output ports P2, P3, P4, and P5, and the output ports P6, P7, P8, and P9 has an optical connector adapter that mounts an optical fiber in such a way as capable of attaching and removing the optical fiber.

The first optical signal λ1 is input to the input port P1 from the electro-optical converter 16. The first optical signal λ1 is passed through the wavelength division multiplex optical coupler 10 and is provided to the optical star coupler 12. The optical star coupler 12 divides the first optical signal λ1 into four first optical signals λ1. Each of the divided first optical signals λ1 is provided to the input/output ports P2, P3, P4, and P5.

The second optical signals λ2a, λ2b, λ2c, and λ2d are input from the each of input/output ports P2, P3, P4, and P5. The optical star coupler 12 multiplexes the second optical signals λ2a, λ2b, λ2c, and λ2d and outputs to the wavelength division multiplex optical coupler 10. The optical star coupler 12 is a wide band star coupler. The multiplexed second optical signal λ2 is provided to the output port Pn by the wavelength division multiplex optical coupler 10. The wavelength division multiplex optical coupler 10 selects an optical signal having the same wavelength as the multi-plexed second optical signal λ2 from input optical signals and outputs the selected optical signal to the output port Pn.

The first embodiment of the optical transmission system does not need the means of avoiding the beat noise, which will be described later. The second embodiment of the optical transmission system has the advantage that only one wavelength division multiplex optical coupler is required, and the electric signal multiplexer 50 is not necessary.

Especially, the second embodiment is efficient when the beat noise can be essentially ignored. The case that the beat noise can be ignored is shown in the article such as Y. Tarusawa et.al., "C/N Improved Analog Optic-Fiber Transmission by Wavelength Offset Combining.", Proc. IEICE Fall Conf.'93, B-336(1993), Y. Shinoda et.al., "A quantitative estimation of beat noise for optical passive network.", Proc. IEICE Fall Conf.'93, B-851(1993), and Y. Shinoda et.al., "A quantitative study on beat noise as a function of wavelength space in Optical Passive Network.", Proc. IEICE Spring Conf.'94, B-1123(1994).

The beat noise is caused by the slight difference in the wavelength of the optical signals. The small difference in the wavelength can be generated when a multiplexed optical signal is converted to an electric signal. The small difference in the wavelength can be also generated by the non-linearity of a light-receiving element.

The second optical signals λ2a, λ2b, λ2c, and λ2d are an electromagnetic wave. The photo diode, which is used as the circuit element of the opto-electric converter 22, has a non-linearity. When receiving more than two optical signals having different wavelength, the beat noise is generated in the frequency band of the electric signal corresponding to the difference in wavelength of the optical signals because of the non-linearity of the photo diode. Therefore, it is necessary to shift the frequency band of the beat noise out of the frequency band of the electric signal used in communication.

There are several ways to shift the frequency band of the beat noise from the frequency band used in communication. One method is to make the wavelength of the second optical signals λ2a, λ2b, λ2c, and λ2d different with each other by the prescribed amount so that the frequency band of the electric signal corresponding to the difference of the wavelengths to be out of the frequency band used in communication.

In both the first and second embodiments, the wavelength division multiplex optical star coupler 14 and 15 can be manufactured by connecting the optical star coupler 12 to the wavelength division multiplex optical couplers 10, which are the independent optical parts, as shown in FIG. 5 and FIG. 7. Generally, the input/output parts of the optical star coupler 12 and the wavelength division multiplex optical coupler 10 are often composed of the optical fiber strands with 250 μm of outward diameter. Therefore, in order to pack the independent optical parts inside the equipment, the optical fiber strands have to be packed inside the equipment without breaking the optical fiber strands by considering the curvature of the optical fiber strands.

This problem can be solved by packing the wavelength division multiplex optical star coupler 14 or 15 inside the housing 60. The optical fiber strands are also packed inside the housing 60. Furthermore, an optical connector adapter is provided for each of the input/output ports P2, P3, P4, and P5, the output ports P6, P7, P8, and P9 or Pn, and the input port P1. The optical connector adapter mounts an optical fiber in such a way as capable of attaching and removing the optical fiber. The optical connector adapter is attached to the housing 60. Because the wavelength division multiplex optical star coupler 14 or 15 can be handled as a single unit, the work of packing the optical fiber can be minimized, and thus the working performance of assembling the equipment can be improved.

The wavelength division multiplex optical star coupler 14 or 15 can be handled as a single unit by composing the parts of the wavelength division multiplex optical star coupler 14 or 15, such as the optical star coupler 12 and the wavelength division multiplex optical coupler 10, on the same substrate as a single unit. Furthermore, the wavelength division multiplex optical star coupler 14 and 15 can be easily manufactured by using niobic lithium, $LiNbO_3$, as a material of the substrate. The wavelength division multiplex optical star coupler 14 and 15 can be easily manufactured by using a conventional optical fiber fusion optical coupler or a conventional waveguide optical coupler for the optical star coupler 12 and the wavelength division multiplex optical coupler 10.

Although the present invention has been described by reference to specific embodiments, the scope of the present invention is not limited to these embodiments. Those skilled in the art can make various modifications and improvements to these embodiments of the present invention. It is clear from the appended claims that such modifications or improvements are also covered by the scope of the present invention.

What is claimed is:

1. An optical transmission system comprising:
    a main unit which inputs a first electric signal and outputs a plurality of first optical signals, and inputs a second optical signal and outputs a second electric signal;
    a plurality of sub units, each of which inputs one of said plurality of first optical signals from said main unit and outputs a third electric signal, and inputs a fourth electric signal and provides said second optical signal to said main unit; and
    a plurality of optical fibers, each of which connects said main unit and said plurality of sub units,
    wherein said main unit comprises:
    an electro-optical converter which inputs said first electric signal and converts said first electric signal to a first optical signal;
    a coupler unit comprising:
        a first optical coupler which divides said first optical signal into a plurality of first optical signals;
        a plurality of input/output ports, each of which outputs one of said plurality of first optical signals divided by said first optical coupler to one of said sub units through one of said optical fibers and inputs said second optical signal from one of said sub units through one of said optical fibers;
        an output port which outputs said second optical signal; and
        a second optical coupler, provided between said first optical coupler and said input/output ports, which provides said first optical signal to said input/output ports and said second optical signal to said output port;
    an opto-electric converter which converts said second optical signal output from said output port to a second electric signal; and
    an electric signal output terminal which outputs said second electric signal.

2. An optical transmission system comprising:
    a main unit which inputs a first electric signal and outputs a plurality of first optical signals, and inputs a second optical signal and outputs a second electric signal;
    a plurality of sub units, each of which inputs one of said plurality of first optical signals from said main unit and outputs a third electric signal, and inputs a fourth electric signal and provides said second optical signal to said main unit; and
    a plurality of optical fibers, each of which connects said main unit and said plurality of sub units,
    wherein said main unit comprises:
    an electro-optical converter which inputs said first electric signal and converts said first electric signal to a first optical signal;
    a first optical coupler which divides said first optical signal into a plurality of said optical signals;
    a plurality of input/output ports, each of which outputs one of said plurality of first optical signals divided by said first optical coupler to one of said sub units through one of said optical fibers and inputs said second optical signal from one of said sub units through one of said optical fibers;
    a plurality of output ports which output said second optical signal;
    a plurality of second optical couplers, each of which is provided for one of a plurality of said output ports, and provided between said electro-optical converter and said first optical coupler or between said first optical coupler and said input/output ports, which provides said first optical signal to said input/output ports and said second optical signal to said output port;
    an opto-electric converter which converts said second optical signal output from said output port to a second electric signal;
    an electric signal output terminal which outputs said second electric signal; and
    an electric signal multiplexer which multiplexes a plurality of said second electric signals output from a plurality of said opto-electric converters and outputs said multiplexed second electric signal to said electric signal output terminal, wherein:
    each of said second optical couplers provides one of said second optical signals to one of said plurality of output ports;
    each of said plurality of output ports outputs one of said second optical signals; and
    each of said opto-electric converters converts one of said second optical signals to said second electric signal.

3. An optical transmission system as claimed in claim 1, wherein said second optical coupler is provided between said electro-optical converter and said first optical coupler;
    said first optical coupler further multiplexes a plurality of said second optical signals and provides said second optical signals to said second optical coupler; and
    said second optical coupler provides said first optical signal input from said electro-optical converter to said first optical coupler and provides said second optical signal multiplexed by said first optical coupler to said output port.

4. An optical transmission system as claimed in claim 1, wherein said second optical coupler is a wavelength division multiplex optical coupler that selects an optical signal, a wavelength of which has a prescribed relationship with a wavelength of said second optical coupler and outputs said selected optical signal to said output port.

5. An optical transmission system as claimed in claim 1, wherein said sub unit further comprises:

a sub unit input/output terminal which inputs said first optical signal from said main unit through said optical fiber;

an opto-electric converter which inputs said first optical signal and converts said first optical signal to said third electric signal;

an antenna which outputs said third electric signal and inputs said fourth electric signal;

an electro-optical converter which converts said fourth electric signal to said second optical signal; and a wavelength division multiplex optical coupler which provides said first optical signal to said opto-electric converter and said second optical signal to said sub unit input/output terminal.

6. An optical transmission system as claimed in claim 1, wherein each of said input/output port and said output port has an optical connector adapter that detachably mounts an optical fiber.

7. A optical transmission system as claimed in claim 1, wherein said coupler unit is constituted monolithically on a circuit board.

* * * * *